United States Patent [19]
Yeh

[11] Patent Number: 5,497,464
[45] Date of Patent: Mar. 5, 1996

[54] ADDRESS MAPPING LOGIC FOR TRANSFERRING DATA BETWEEN A PERIPHERAL DEVICE OF A BASE FUNCTION EXPANDER UNIT AND A PALMTOP COMPUTER AS IF THE PERIPHERAL WAS A PERIPHERAL OF THE COMPUTER

[76] Inventor: Keming W. Yeh, 43765 Abeloe Ter., Fremont, Calif. 94539

[21] Appl. No.: 82,200

[22] Filed: Jun. 24, 1993

Related U.S. Application Data

[63] Continuation-in-part of Ser. No. 975,375, Nov. 13, 1992, which is a continuation-in-part of Ser. No. 786,483, Nov. 1, 1991, abandoned.

[51] Int. Cl.$^6$ .................................................. G06F 13/00
[52] U.S. Cl. ....................... 395/200.01; 395/200.16; 395/308; 395/846; 364/DIG. 1; 364/231; 364/231.1; 364/231.2; 364/240; 364/240.2; 364/708.1
[58] Field of Search .................. 235/380; 361/392, 361/393, 394, 395; 364/708; 395/200, 205, 325, 500, 800

[56] References Cited

U.S. PATENT DOCUMENTS

| | | | |
|---|---|---|---|
| 4,377,852 | 3/1983 | Thompson | 395/500 |
| 4,654,818 | 3/1987 | Wetterau, Jr. | 395/275 |
| 4,769,764 | 9/1988 | Levanon | 364/708 |
| 4,777,590 | 10/1988 | Durkos et al. | 395/800 |
| 4,903,222 | 2/1990 | Carter et al. | 364/708 |
| 5,126,954 | 6/1992 | Morita | 364/708 |
| 5,224,216 | 6/1993 | Gordon et al. | 395/275 |
| 5,227,953 | 7/1993 | Lindberg et al. | 361/393 |
| 5,265,238 | 11/1993 | Canova, Jr. et al. | 395/500 |
| 5,301,334 | 4/1994 | Horiuchi | 395/750 |
| 5,347,425 | 9/1994 | Herron et al. | 361/683 |

Primary Examiner—Thomas C. Lee
Assistant Examiner—Lance L. Barry
Attorney, Agent, or Firm—Skjerven, Morrill, MacPherson, Franklin & Friel; Edward C. Kwok

[57] ABSTRACT

A portable information storage and transfer device for use with integrated circuit (IC) memory card-based palmtop computers obviates many operations traditionally requiring a desktop computer. An external floppy disk drive allows large amount of data and software programs to be made available to the IC memory card-based computer on floppy disks. In addition, two memory card slots are provided to allow reading and writing IC memory card under either the proprietary format of the palmtop computer or an industry standard format, such as Personal Computer Memory Card International Association (PCMIA). Data interchange is thus between media written under disparate operating systems, file structures and basic input/output structures.

29 Claims, 6 Drawing Sheets

PERIPHERAL DEVICES

ADDRESS MAPPING LOGIC FOR TRANSFERRING DATA BETWEEN A PERIPHERAL DEVICE OF A BASE FUNCTION EXPANDER UNIT AND A PALMTOP COMPUTER AS IF THE PERIPHERAL WAS A PERIPHERAL OF THE COMPUTER

CROSS-REFERENCE TO RELATED APPLICATIONS

This patent application is a continuation-in-part application of application entitled "Portable Information Storage and Transfer Device for Portable Computers" by Dr. Keming W. Yeh, Ser. No. 07/975,375, filed on Nov. 13, 1992, which is a continuation-in-part of an application entitled "Portable Information Storage and Transfer Device for Portable Computers," Ser. No. 07/786,483 filed on Nov. 1, 1991, now abandoned.

FIELD OF INVENTION

This invention relates to the field of portable and handheld computers and particularly to an information storage and transfer device for use with integrated circuit memory card-based hand-held and portable computers.

BACKGROUND OF THE INVENTION

Many portable computers, especially hand-held or "palmtop" computers, use integrated circuit memory cards ("IC memory cards") as the primary media of information storage. Such IC memory cards include memory storage elements, such as static random access memory (SRAM), or electrical programmable and erasable non-volatile memory elements, such as "flash" memory. These IC memory cards are typically the size of a customary credit card. IC memory card slots are used in portable computers in place of hard disk drives and floppy disk drives (HDDs, FDDs) to achieve in the portable computer the significant advantages of size, weight, and battery lifetime. In addition, the removeable IC memory cards provide storage media portability. However, because of the limited storage density attainable in each IC memory card, and the high cost of IC memory chips, using IC memory cards in hand-held computers imposes limitations not encountered in less portable computers, which typically use more power-consuming and heavier hard and floppy disk drives as their primary storage media. Also, in order to avoid the sizes and weights of a necessary higher voltage power supply unit and an interface adaptor, a handheld computer is typically not equipped with a standardized interface (e.g. RS232C) found on the larger desktop and laptop computers. This is because such a standardized interface is larger than can be conveniently provided on such a hand-held computer, and requires both voltage and power output levels impractical for such a hand-held computer, if the requirements of size, weight and long battery lifetime are to be met.

Another disadvantage often found in a hand-held computer using IC memory card as the primary storage media results from the hand-held computer's inability to provide a variety of system services normally available in a larger computer, e.g. connection to a hard copy device, or data transfer to a backup facility to prevent loss of data. Many of these system services are not provided because, for a hand-held computer, a standardized interface to peripheral equipment is too bulky and requires the hand-held computer to generate voltage levels impractical in view of the hand-held computer's size, weight and power conservation requirements. Thus, in the prior art, such a hand-held computer interfaces to a peripheral device through a separate adapter which provides the standard size connector, and the necessary voltage level and signal representation conversions. At present, a number of these adapters are required to provide the various interfaces to common peripheral devices. Such adapters are bulky and cannot be simultaneously connected to the single small I/O connector on the hand-held computer. In addition, each adaptor is connected to the hand-held computer via a customized cable and powered by the power supply of the hand-held computer. Thus, even for performing the most common applications, such as data backup and printing, the hand-held computer requires multiple adapters and each adaptor drains the precious battery power from the hand-held computer. To perform data backup, for example, a popular "PC-link cable" is used to connect the hand-held computer to the RS232C (serial) port of a desk top computer over a customized cable and a bulky attachment. Even then, the PC link cable provides only data transfer capability. Further, to use the PC link cable, the user is required to run a customized software and to set up the desktop computer. To perform printing, a "printer-link cable" connects the hand-held computer to a printer. Again, the connection to the printer requires another customized cable, a bulky adaptor and the use of a customized software. Of significance also, because the PC-link and printer-link cables plug into the same port on the hand-held computer, printing and data backup cannot be performed simultaneously. Further, since the printer-link and PC-link cables are expensive relative to the cost of the handheld computer, customized cables and adapters are very uneconomical ways to provide common applications in the hand-held computer.

Therefore, because of the limited functionalities necessitated by the size, weight and long battery lifetime requirements of a portable computer, the user is often required to transfer data from the portable computer to a desktop computer for such tasks as data backup or printing. The importance of such functions as backing up information or obtaining hard copies is self-evident, once one appreciates that the data most often stored in such computers are, for example, telephone numbers, addresses, memoranda, past appointment schedules, spreadsheets, and databases. Information backups are particularly essential for record keeping and for recovering from an occasional system malfunction.

In addition, because the storage capacity of an IC memory card-based portable computer is limited, it is often necessary to unload some of the stored telephone numbers, address records, or the software and data of one application program to create room for new telephone numbers, address records, or data and software of another application program. Currently, data transfer between the portable computer and the desk top computer is cumbersome and error-prone for the non-expert users. For example, the user may be required to buy both a customized connection cable and a special communication software, and be required to perform a sophisticated set of tasks, such as connecting the cable to a RS232C port on the backplane of a desktop computer, setting up files and operating the communication software from the desktop computer. For many people, the apparent level of required skill to perform these tasks is a psychological barrier to their ability to use the portable computer effectively. Further, the added cost of a desktop computer is often not justified for people who do not otherwise need a desk-top computer.

The resource limitations of a palmtop computer also dictate the use of customized operating systems and file structures in these palmtop computers. These customized operating systems and file structures are impediments to data transfer and software interoperability between the palmtop computers and the more standardized larger systems.

Also, in the past, IC memory cards are formatted in the proprietary formats of the palmtop computer manufacturers. Consequently, IC memory cards used in palmtop computers from different manufacturers are not interchangeable with each other, nor can these IC memory cards be shared between a palmtop computer and a larger desktop computer, where standardization is more prevalent. However, as the PCMCIA (Personal Computer Memory Card International Association) standard becomes more widely adopted, there is a great need for a method whereby data stored in the proprietary formats of the palmtop computers can be exchanged under the PCMCIA format without costly modifications in the palmtop computers.

In the prior art, there are numerous intelligent peripheral devices for such functions as information storage, printout, communication, and input/output (I/O). However, none of these devices integrate these functions into a single device in the manner achieved by the present invention to be described hereinafter.

SUMMARY OF THE INVENTION

In accordance with the present invention, a structure and a method are provided to achieve an information storage and transfer device for use with a portable or hand-held computer.

The data ports of the information storage and transfer device include one or more standardized interfaces to a host computer or peripheral devices. For example, such interfaces include an enchanced parallel port (EPP) for connecting to a printer or a floppy disk drive, a RS232C serial port for connecting to the telephone system or another communication network, a desk-top computer, or a magnetic-card reader, and other ports customized for connecting to palmtop computers, scanners, voice and other I/O devices.

The power supply unit allows the device to be powered by an AC power source, disposable or rechargeable batteries, or a car battery.

The housing of the information storage and transfer device is contoured to include on a top surface a recessed area for receiving securely a palmtop computer during device operation. Further, a connector located in the housing allows the power supply unit to be connected to the palmtop computer so as to provide power to the palmtop computer during file transfer into and out of the palmtop computer's storage devices, or when the palmtop computer's modem port is used. The battery in the palmtop computer can also be recharged by the power supply unit through the connector.

In one embodiment of the present invention, a standard card slot for reading such industry standard IC memory card and a customized card slot for reading the palmtop computer's customized IC memory card are provided. The standard IC memory card slot can be used to transfer data to the information storage and transfer device from a data source, such as an industry standard IC memory card customarily found in IBM PC-compatible notebook computers. The standard IC memory card slot provides a conduit for data transfer from a standard IC memory card to another medium connected to the information storage and transfer device, including the customized IC memory card slot. The customized IC memory card slot can be used to write the received data onto an IC memory card in the proprietary format of the palmtop computer's IC memory card. Thus, data transfer between standard IC memory cards and IC memory cards in the palmtop computer's proprietary format is achieved by data transfer between the information storage and transfer device's standard and customized IC memory card slots. Because of this capability for data exchange between the different format IC memory card slots, third party software heretofore distributed only in standard IC memory card format can now be made available for use in the palmtop computer through a simple copy from the standard IC memory card slot to the customized IC memory card slot. Likewise, third party software heretofore distributed only in a standard floppy disk can be made available to the palmtop computer via the information and storage device by simply copying data from the floppy disk to a customized IC memory card.

The present invention provides the advantages of a method and a cost-effective means for transferring large amount of information from any source to an IC memory card-based portable computer.

The present invention also provides the advantages of a method and an efficient device for an IC memory card-based portable computer, without using a separate desk-top computer, to perform such functions as information backup, duplication, communication, printing and data input from other devices.

The present invention provides the advantages of both a method and an apparatus, including built-in software, for accessing regular communication networks, such as the public telephone switch system. A built-in data and facsimile modem in one embodiment of the present invention provides access to facsimile machines, and allows data transmitted or received over the built-in modem to be backed up on IC memory cards. In another embodiment of the present invention, the built-in modem provides connection to wireless communication devices, such as a cellular phone.

DETAILED DESCRIPTION OF THE PREFERRED EMBODIMENTS

The "information storage and transfer device" of the present invention provides a convenient interface to numerous peripherals traditionally compatible only with desktop or portable computers. In addition, the information storage and transfer device of the present invention allows data interchange between proprietary formats of the palmtop computer to industry standard formats. This ability of data interchange allows convenient data transfer across the disparate operating systems and file structures of the palmtop computer and other larger and more standardized desktop and portable computers.

Various applications of information storage and transfer devices are described in the patent applications, Ser. Nos. 07/975,375 and 07/786,483 (now abandoned) referenced in the Cross Reference to Related Applications section above. Therefore, the descriptions of such applications for which the information storage and transfer devices of the present invention can also be used are therefore omitted. These patent applications are hereby incorporated by reference in their entireties.

Figure 1A:
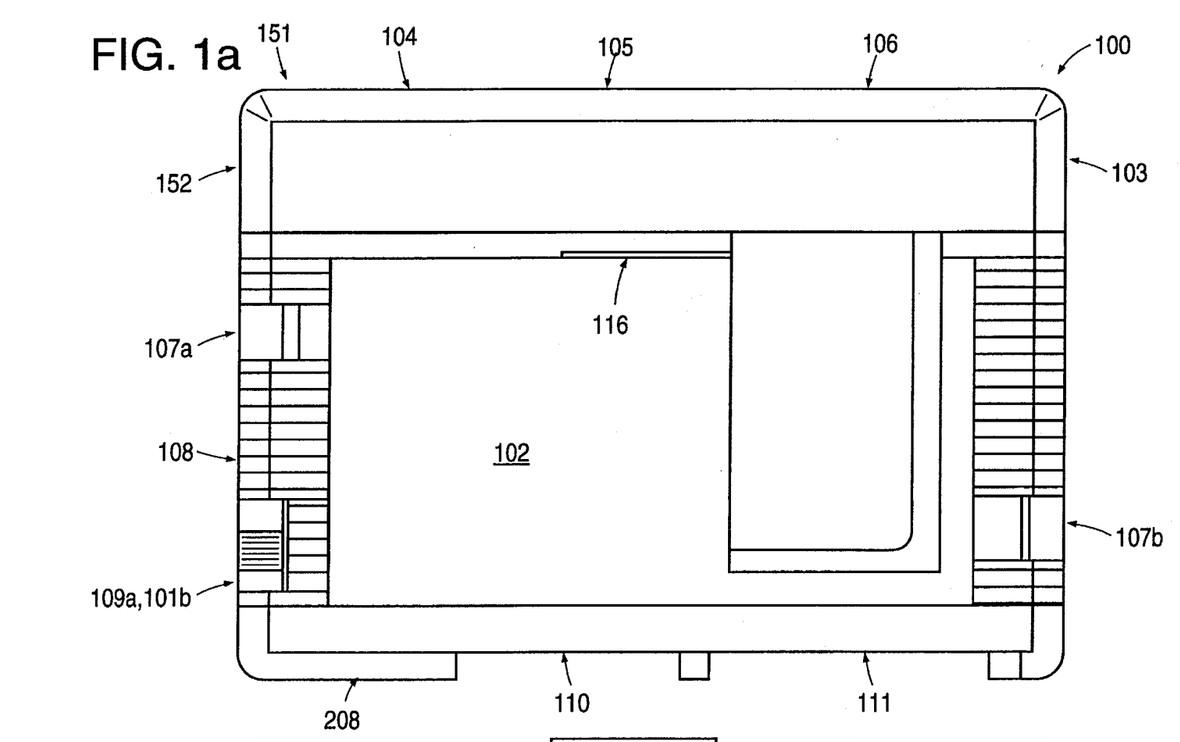
FIG. 1a shows housing 103 of a "information storage and transfer device" 100 of the present invention.
Figure 1B:
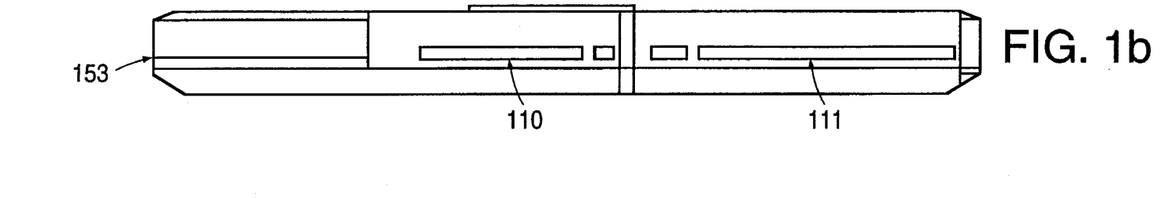
FIGS. 1b and 1c are side views of information storage and transfer device 100, showing side panels 153 and 154 respectively.

FIG. 1a shows a housing 103 of an information storage and transfer device 100 in accordance with the present invention. As shown in FIG. 1a, housing 103 of information storage and transfer device 100 has a recess 102 on the top surface contoured for accommodating a palmtop computer, such as any of the line of palmtop computers "WIZARD™" from Sharp Corporation, Tokyo, Japan. On side panel 151, behind a cover (not shown), there are provided an industry standard serial port 104 (e.g. an RS232C serial port), a parallel printer port 105 (e.g. a Centronics printer port), and a disk drive or enhanced parallel port (EPP) 106. An external disk drive connected to disk drive port 106 typically has its own controller and memory used for caching. Clips 107a and 107b are provided on the periphery of recess 102 to secure the palmtop computer to the information storage and transfer device. Connector 116 at port 302 of information storage and transfer device 100 is used to connect to a customized port of the palmtop computer. In this embodiment, two RJ11 connectors 109a and 109b are provided to connect information storage and transfer device 100 to a telephone line in a daisy chain with other telephone equipment. Two receptacles ("memory card slots") 110 and 111 are provided on side panel 153 to receive IC memory cards. Side panel 153 is shown in FIG. 1b. Memory card slot 110 receives memory cards conforming to the PCMCIA standard, and memory card slot 111 receives memory cards in the palmtop computer's proprietary format. Information storage and transfer device 100 allows the palmtop computer to read and write both PCMCIA memory cards and IC memory cards of the palmtop computer's proprietary format, and allows data exchange between memory cards of these formats.

Figure 1C:
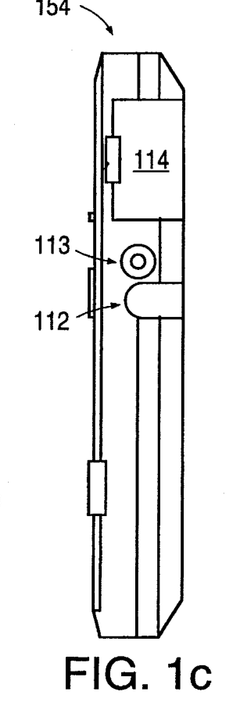

On side panel 154, which is shown in FIG. 1c, are provided a reset button 112, a second serial port 114 behind a flip-down door, and a receptacle 113 for a power cord from a source of 9 V DC power. This DC power can be provided by a step-down transformer/rectifier which receives household AC power. When a palmtop computer is docked in information storage and transfer device 100, this DC power also provides power to the palmtop computer and recharges the battery of the palmtop computer, which is located in a battery compartment 115 (not shown). The battery in battery compartment 115 provides backup power to information storage and transfer device 100, so as to allow information storage and transfer device 100 to be used as a portable device.

Figure 1D:
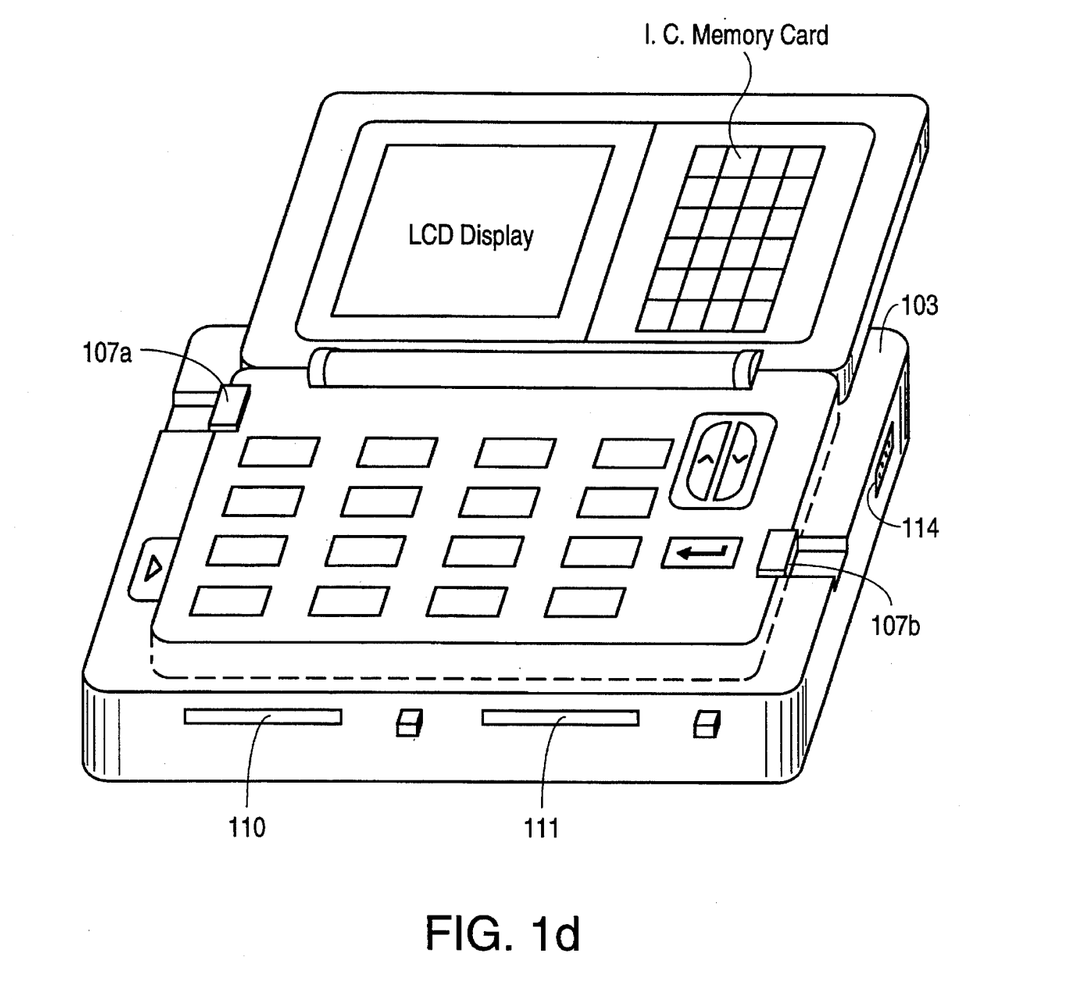
FIG. 1d is a drawing of a palmtop computer "docked" in information storage and transfer device 100.

FIG. 1d shows a palmtop computer "docked" at information storage and transfer device 100.

Figure 2:
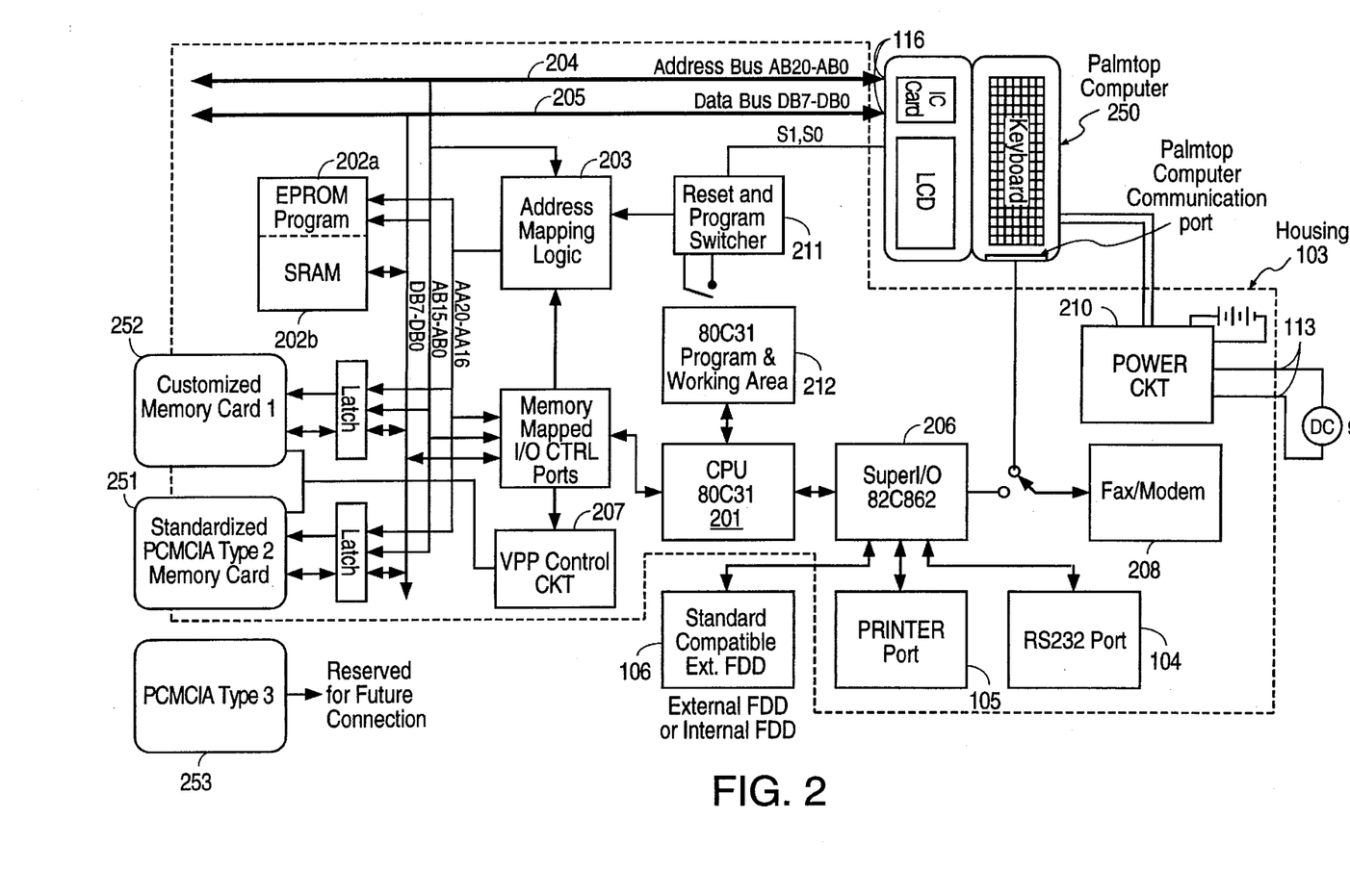
FIG. 2 is a block diagram of an information storage and transfer device 100, in accordance with one embodiment of the present invention.

FIG. 2 is a block diagram of information storage and transfer device 100, in one embodiment of the present invention. As shown in FIG. 2, information storage and transfer device 100 is controlled by a microprocessor controller 201. One microprocessor which can be used to perform the functions of controller 201 is the 80C31 controller, which is widely available, e.g. from "Intel" Corporation, Santa Clara, Calif. Controller 201 is provided with a program and working area 212, which is implemented in this embodiment by static random access memory, for storing control programs for execution by controller 201.

A non-volatile storage element 202a, which can be implemented by an erasable programmable read-only memory (EPROM), and static random access memory (SRAM) 202b, are provided to store bootstrap programs and to serve as run-time memory respectively. EPROM 202a and SRAM 202b are accessible by both controller 201 and the palmtop computer.

In this embodiment, several peripheral devices on information storage and transfer device 100 are each mapped to a memory address in the memory address space of the controller 201. Under this scheme, information storage and transfer device 100 treats the palmtop computer 250, when plugged into the information storage and transfer device 100, as a peripheral device. In FIG. 2, two other memory-mapped peripheral devices shown are customized memory card slot 252, and PCMCIA memory card slot 251. In the present embodiment, PCMCIA memory card slot 251 accepts type II PCMCIA memory cards. An addition memory card slot 253 which accepts type III PCMCIA memory cards can be activated, if required.

Address mapping is performed by address mapping logic 203, which drives the five most significant bits of 21-bit address bus 204. The remaining sixteen bits of address bus 204 are common with the sixteen least significant bits of the palmtop computer's internal address bus. In this embodiment, a custom-designed connector 116 is provided to tap into the internal 21-bit address bus and 8-bit data bus of the palmtop computer. While the palmtop computer is connected to information storage and transfer device 100, this custom-designed connector 116 plugs into the palmtop computer's memory card slot in place of an IC memory card. For the present embodiment, the specification of the palmtop computer's internal address and data buses can be obtained from the aforementioned Sharp Corporation.

The lowest sixteen bits of the address bus 204 and the bits of 8-bit data bus 205 are driven by the memory-mapped I/O controller 206. Address bus 204 and data bus 205 are accessed by non-volatile memory 202a, SRAM 202b and memory card slots 251 and 252. A programming voltage control circuit 207 provides the voltage levels used to perform the write operations on the IC memory cards of memory card slots 251 and 252. Information storage and transfer device 100 provides an internal modem 208 which is capable of sending and receiving voice, data and facsimile transmission. Internal modem 208 includes a solid state answering machine which is capable of storing voice messages onto the storage medium of a peripheral storage device, e.g. an IC memory card of either memory card slot 111 or 110. Modem 208 is also equipped to extract caller ID information from an incoming call to correctly identify the caller. Application programs can make use of such caller identification to perform specific tasks, such as automatically searching and retrieving for display information associated with the caller from a data base in the palmtop computer docked in information storage and transfer device 100. Access to a telephone line is provided by RJ11 connectors 109a and 109b.

Serial ports 104 and 114, parallel port 105 and floppy disk drive interface 106 are controlled by an I/O controller 206.

An integrated circuit, such as the 82C862 from "Intel" Corporation, Santa Clara, Calif., can provide the functions of I/O controller 206.

Power circuit 210, which receives from power receptacle 113 9 V DC power, is the power supply for information storage and transfer device 100. Power circuit 210 also provides power to a palmtop computer docked at information storage and transfer device 100.

The reset and program switcher logic 211 allows information storage and transfer device 100 to be reset under the control of either the palmtop computer or the external switch. When the palmtop computer resets, a corresponding reset signal is sent to information storage and transfer device 100 on signal lines S1 and S0. This reset signal is caught by reset and program logic 211, which in turns resets information storage and transfer device 100.

SRAM 202b typically has more memory than the palmtop computer. Consequently, multiple application programs can be loaded into SRAM 202b. To the palmtop computer, IC memory card adaptor 116 represents an IC memory card having the capacity of SRAM 202b. Thus, multiple application programs can be run from SRAM 202b. Address mapping logic 203 maps the physical addresses of these application programs to the address space of the palmtop computer. In this embodiment, the palmtop computer executes an application program from a fixed location in its address space.

Figure 3:
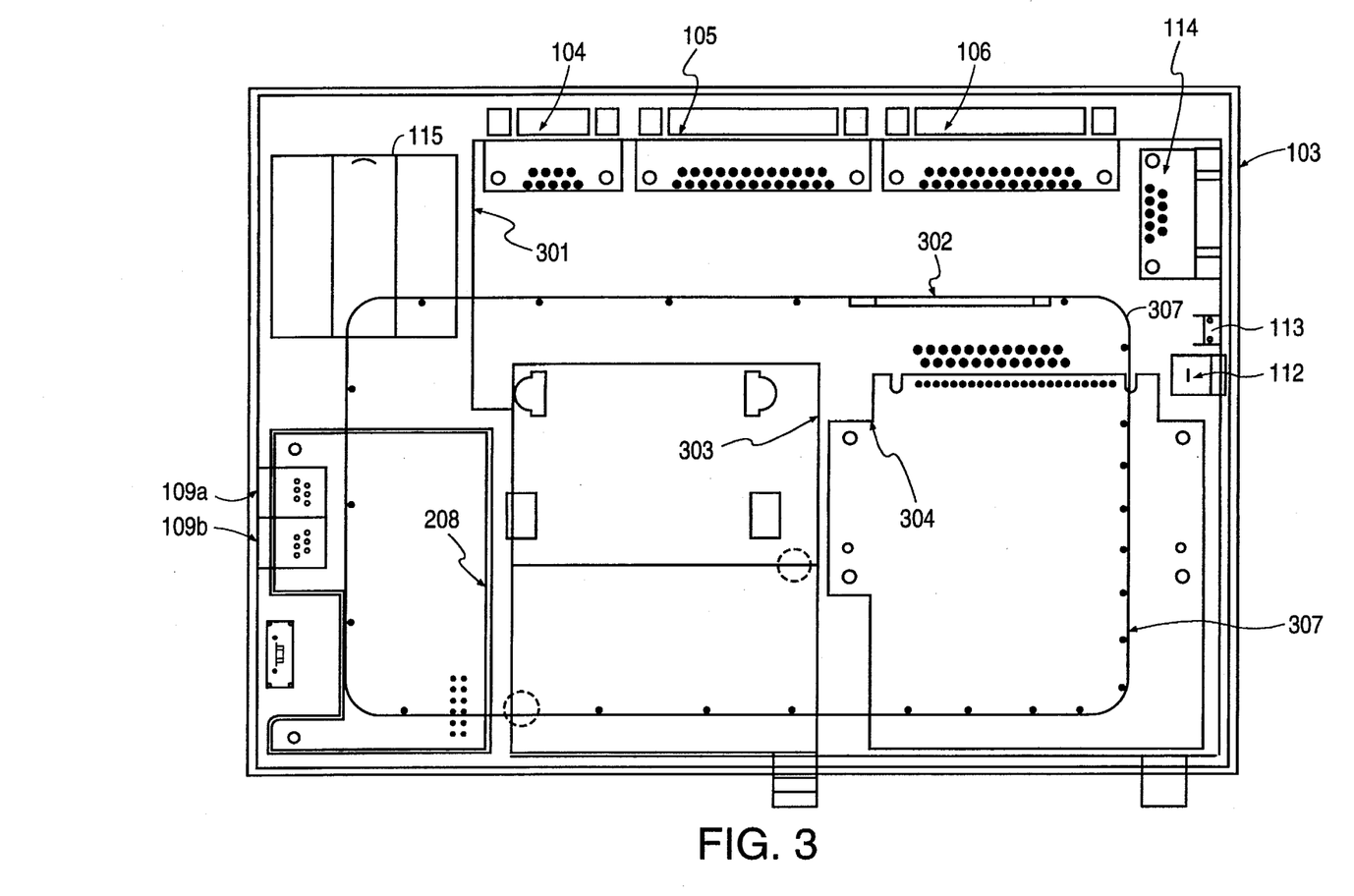
FIG. 3 is a top-view of the locations of components inside housing 103 in information storage and transfer device 100 of FIG. 1.

FIG. 3 shows the location of components within housing 103 of information storage and transfer device 100. As shown in FIG. 3, a printed circuit board 301 houses power circuit 210, the control circuits for the serial ports 104 and 114, parallel port 105 and disk drive interface 106, SRAM 202a and EPROM 202b, the controller 201, and I/O controller 206. Area 307 on the top surface of housing 103 is contoured to provide recess 102 for accommodating a palmtop computer. The custom-designed connector 116 connects information storage and transfer device 100 at location 302. Assemblies 303 and 304 are the adaptor assemblies for receiving respectively an PCMCIA memory card and the palmtop computer's customized IC memory card.

Removable modem 208 is provided next to printed circuit board 301. The battery compartment 115 is located at a convenient location in housing 103.

In this embodiment, an emulation software for emulating file structures of an industry standard operating system, e.g. Microsoft's disk operating system "DOS™", is provided on the palmtop computer, so as to allow the palmtop computer to read from or write to a PCMCIA memory card in memory card slot 110. The proprietary file structure of the palmtop computer, the file structure of an industry standard operating system, and the implementations of the palmtop computer's BIOS (i.e. the basic input/output firmware) and an industry standard BIOS are information available to the program developers of the palmtop computer. Thus, upon consideration of such information, a skilled person can readily provide an emulation program for converting a file between these formats. Using this emulation program, the PCMCIA format memory card can be used as a data interchange medium between the palmtop computer and the larger industry standard computers. Such an emulation program can also be provided to run on either a host computer or on controller 201, to allow reading and writing the palmtop computer's proprietary IC memory card, using memory card slot 111. Hence, data interchange between dissimilar operating systems, file structures and basic input/output firmware is achieved in accordance with the present invention.

In this embodiment, a device driver for the external floppy disk drive is installed on the palmtop computer to allow the palmtop computer to read and write floppy disks through disk drive interface 106.

Figure 4A:
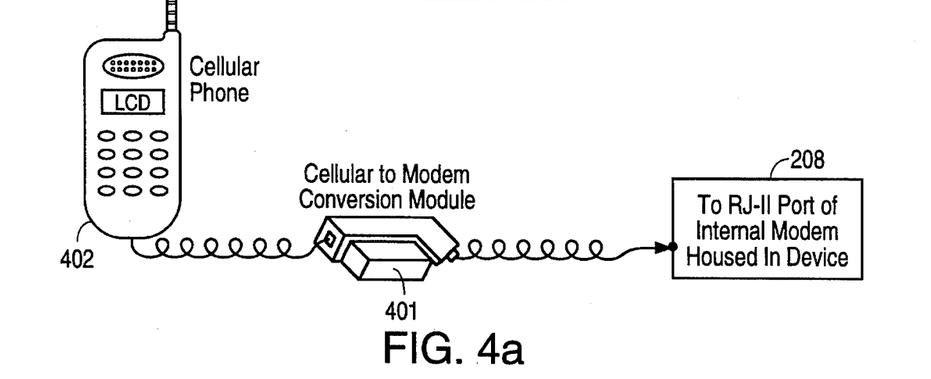
FIGS. 4a, 4b, 4c, and 4d show peripheral devices connecting to an information storage and transfer device of the present invention.

FIG. 4a shows an application in which internal modem 208 of information storage and transfer device 100 accesses the telephone network through a cellular phone connection. As shown in FIG. 4a, internal modem 208 of the information storage and transfer device 100 is connected through a RJ11 phone jack on housing 103 to a commercially available cellular-to-modem conversion module 401 to a cellular phone 402. In this application, information storage and transfer device 100 can be used as a data communication link in a totally mobile fashion.

Figure 4B:
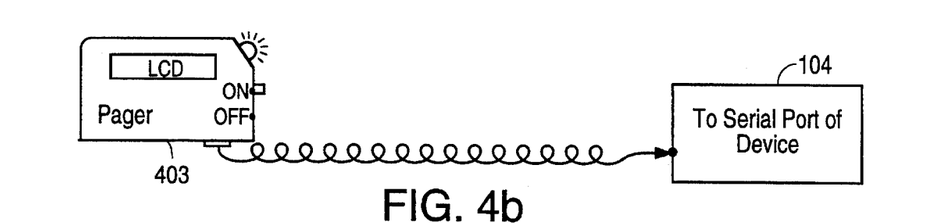

FIG. 4b shows serial port 104 of information storage and transfer device 100 in an application in which information storage and transfer device 100 receives input from a pager 403. In this application, paging information can be automatically logged onto a permanent storage medium, such as a floppy disk or a memory card.

Figure 4C:
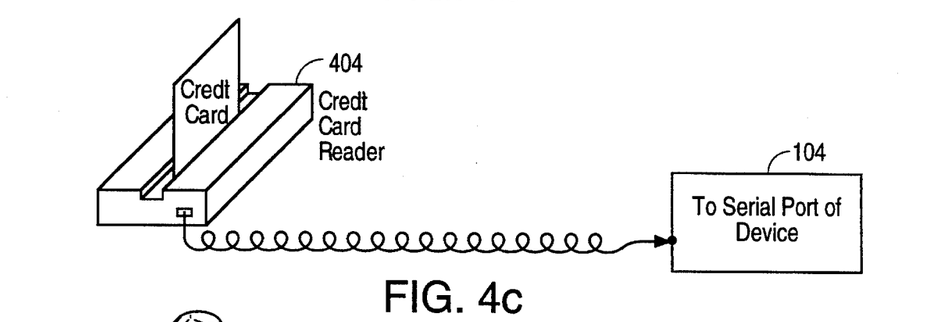

FIG. 4c shows serial port 104 of information storage and transfer device 100 in an application in which information storage and transfer device 100 receives input from a credit card reader 404.

Figure 4D:
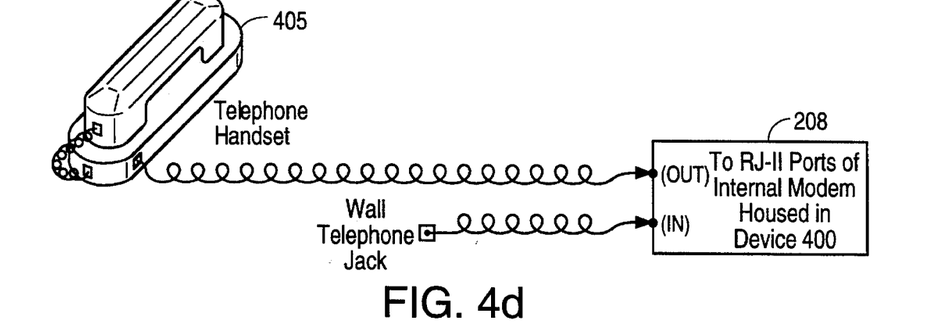

FIG. 4d shows information storage and transfer device 100 in an application in which information storage and transfer device 100 is connected through an RJ11 jack of housing 103 to a telephone. In this configuration, a caller identification circuitry in information storage and transfer device 100 provides palmtop computer 250 the ability to use the caller identification information in application programs and in conjunction with information stored in the palmtop computer.

Figure 5:
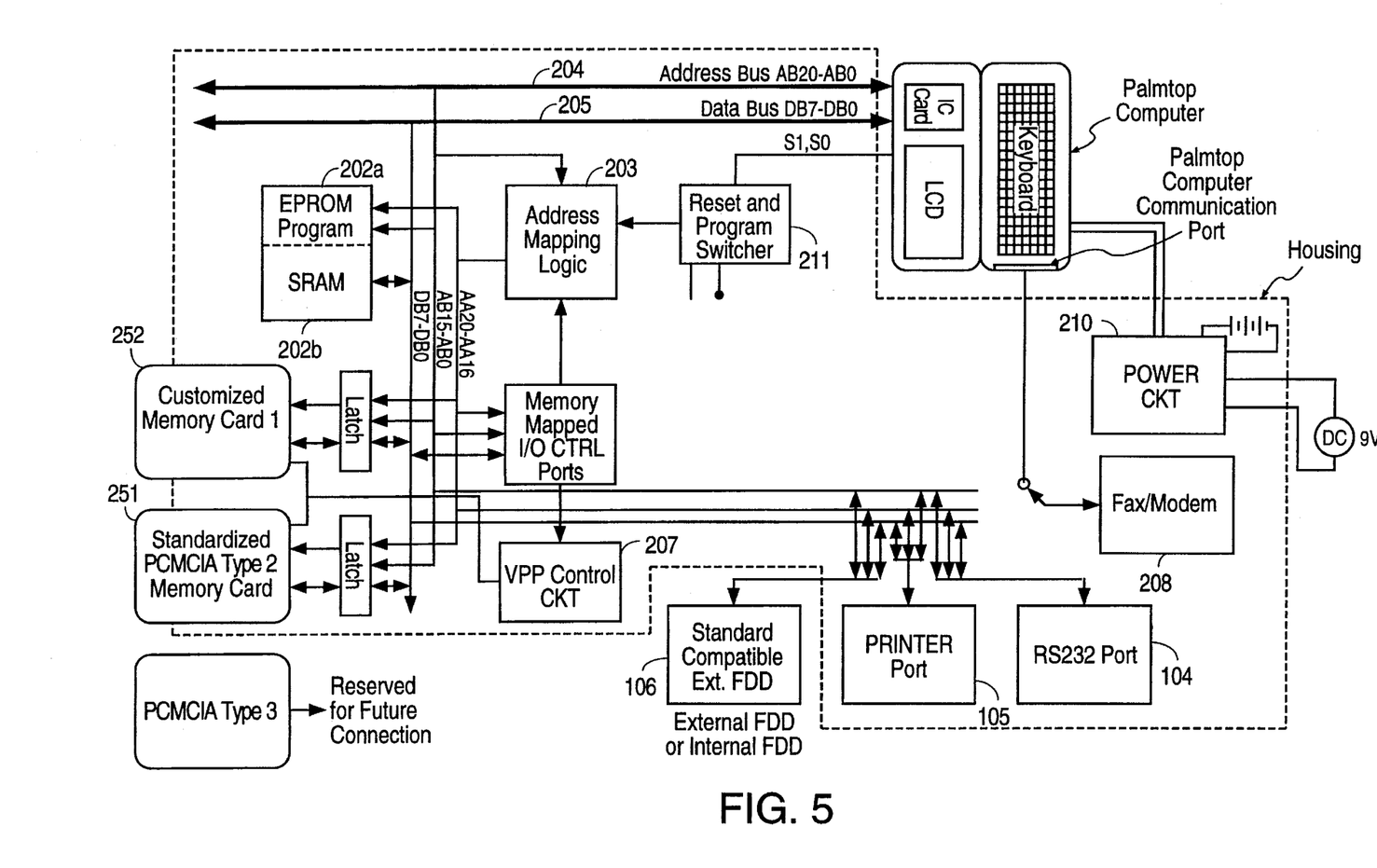
FIG. 5 is a block diagram of information storage and transfer device 100, in accordance with another embodiment of the present invention.

FIG. 5 is a block diagram of information storage and transfer device 100, in accordance with another embodiment of the present invention. In the embodiment of FIG. 5, Controller 201 and I/O controller 206 are not provided in information storage and transfer device 100. Instead, the functions of controller 201 and I/O controller 206 are provided by the central processing unit of the palmtop computer through the address bus 204 and data bus 205. To facilitate comparison, elements in the embodiment of FIG. 5 corresponding in function to elements of FIG. 2 are provided like reference numerals, The operations of these common in the embodiments of FIGS. 1 and 5 are substantially identical. Without the independent controller 201 and the I/O controller 206, the embodiment of FIG. 5 provides an inexpensive information storage and transfer device. However, because the controlling functions are provided by the central processing unit of the palmtop computer, the information storage and transfer device of FIG. 5 is unable to perform stand-alone operations without the palmtop computer.

The above detailed description illustrates the specific embodiments of the present invention and is not intended to be limiting. Numerous variations and modifications can be made without departing from the scope of the present invention. The present invention is defined by the following claims.

What is claimed is:

1. An information storage and transfer device for use with a palmtop computer having an IC memory card drive for reading and writing IC memory cards of a proprietary format, an internal address bus and a data bus, said information storage and transfer device comprising:

a local address bus including a first plurality of address signals and a second plurality of address signals;

an interface for coupling said second plurality of address signals of said local address bus to said internal address bus and said data bus of said palmtop computer, so as to allow data transfer between said palmtop computer and said information storage and transfer device;

an input and output port for connection to external devices;

a peripheral device; and an address mapping logic circuit, coupled to said interface and said local address bus, for driving said first plurality of address signals in said local address bus, said address mapping circuit mapping said peripheral device and said input and output port each to an address of said palmtop computer, so as to allow data transfer between said palmtop computer and said peripheral device and said input and output port to occur over said interface as if said peripheral device and said input and output port are a peripheral device and an input and output port of said palmtop computer.

2. An information storage and transfer device as in claim 1, wherein said peripheral device is an IC memory card drive for reading and writing IC memory cards of a industry standard format different from said proprietary format.

3. An information storage and transfer device as in claim 2, further comprising a microprocessor for controlling said peripheral device and said input and output port to allow said information storage and transfer device to perform stand-alone operation when said interface is inactive.

4. An information storage and transfer device as in claim 3, further comprising a second IC memory card drive for reading and writing IC memory cards in said proprietary format, such that said information storage and transfer device performs data transfer between IC memory cards of said industry standard format and said proprietary format.

5. An information storage and transfer device as in claim 1, further comprising a built-in modem for transmitting and receiving data between said palmtop computer and a host computer over a telephone line.

6. An information storage and transfer device as in claim 5, wherein said built-in modem includes capabilities for receiving and transmitting voice, facsimile and data.

7. An information storage and transfer device as in claim 5, wherein said data is transmitted from and received into an IC memory card of said palmtop computer.

8. An apparatus including:

an information storage and transfer device as in claim 5; and a cellular to modem converter connected to said built-in modem, so as to allow data transmission to said information storage and transfer device to receive signals generated by a cellular phone.

9. An information storage and transfer device as in claim 1, wherein said input and output port being adapted for connection to an external floppy disk drive.

10. An information storage and transfer device as in claim 1, wherein said palmtop computer comprises a customized port having signal levels different from signal levels of said information storage and transfer device, said information storage and transfer device further comprising:

means for communicating data and control information between said palmtop computer and said information storage and transfer device through said customized port; and means for converting said signal levels of said customized port into signal levels of said input and output port so as to allow communication with an external device said data and control information through said input and output port.

11. An information storage and transfer device as in claim 1, further comprising:

a power supply for receiving household AC power and for providing DC power for said information storage and transfer device; and means for connecting to a power input terminal of said palmtop computer, such that said power supply provides DC power to said palmtop computer.

12. An information storage and transfer device as in claim 1, wherein said palmtop computer is powered by a rechargeable battery, said wherein said means for connecting, when connected to said palmtop computer, charges said rechargeable battery of said palmtop computer.

13. An information storage and transfer device as in claim 1, further comprising a housing having a recess contoured for accommodating said palmtop computer.

14. An information storage and transfer device as in claim 13, wherein said connections to said internal address bus and said internal data bus of said palmtop computer include a connector mimicking an IC memory card, said connector coupling said palmtop computer through said IC memory card drive of said palmtop computer.

15. An apparatus as in claim 1, wherein said input and output port is an industry standard RS 232C serial port, for providing said palmtop computer a communication link to a host computer.

16. A method for providing an information storage and transfer device for use with a palmtop computer having an IC memory card drive for reading and writing IC memory cards of a proprietary format, an internal address bus and a data bus, said method comprising the steps of:

providing a local address bus including a first plurality of address signals and a second plurality of address signals;

providing an interface for coupling said second plurality of address signals of said local address bus to said internal address bus and said data bus of said palmtop computer, so as to allow data transfer between said palmtop computer and said information storage and transfer device;

providing an input and output port for connection to external devices;

providing a peripheral device; and providing an address mapping logic circuit, coupled to said interface and said local address bus, for driving said first plurality of address signals in said local address bus, said address mapping circuit mapping said peripheral device and said input and output port each to an address of said palmtop computer, so as to allow data transfer between said palmtop computer and said peripheral device and said input and output port to occur over said interface as if said peripheral device and said input and output port are a peripheral device and an input and output port of said palmtop computer.

17. A method as in claim 16, wherein said peripheral device is an IC memory card drive for reading and writing IC memory cards of a industry standard format different from said proprietary format.

18. A method as in claim 17, further comprising the step of providing a microprocessor to control said peripheral device and said input and output port, so as to allow said information storage and transfer device to perform stand-alone operation when said interface is inactive.

19. A method as in claim 18, further comprising the step of providing a second IC memory card drive for reading and writing IC memory cards in said proprietary format, such that said information storage and transfer device performs data transfer between IC memory cards of said industry standard format and said proprietary format.

20. A method as in claim 16, further comprising the step of providing a built-in modem for transmitting and receiving data between said palmtop computer and a host computer over a telephone line.

21. A method as in claim 20, wherein said built-in modem includes capabilities for receiving and transmitting voice, facsimile and data.

22. A method as in claim 20, wherein said data are received into and transmitted from an IC memory card of said palmtop computer.

23. A method as in claim 16, wherein said input and output port being adapted for connection to an external floppy disk drive.

24. A method as in claim 16, wherein said palmtop computer comprises a customized port having signal levels different from signal levels of said information storage and transfer device, said method further comprising the steps of:

communicating data and control information between said palmtop computer and said information storage and transfer device through said customized port; and converting said signal levels of said customized port into signal levels of said input and output port so as to allow communication with an external device said data and control information through said input and output port.

25. A method as in claim 16, further comprising the steps of:

providing a power supply for receiving household AC power and for providing DC power for said information storage and transfer device; and connecting said power supply to a power input terminal of said palmtop computer, such that said power supply provides DC power to said palmtop computer.

26. A method as in claim 16, wherein said palmtop computer is powered by a rechargeable battery, said wherein said connecting step couples said palmtop computer to charge said rechargeable battery of said palmtop computer.

27. A method as in claim 16, further comprising the step of providing a housing having a recess contoured for accommodating said palmtop computer.

28. A method for providing data transmission between a cellular phone and a palmtop computer comprising the steps of:

providing an information storage and transfer device using the steps of claim 20; and providing a cellular to modem converter connected to said built-in modem, so as to allow data transmission to said information storage and transfer device to receive signals generated by said cellular phone.

29. A method as in claim 16, wherein said input and output port is an industry standard RS 232C serial port, for providing said palmtop computer a communication link to a host computer.

* * * * *